United States Patent
Visser et al.

(10) Patent No.: US 6,176,809 B1
(45) Date of Patent: Jan. 23, 2001

(54) SHIFTER WITH REVERSE AND IGNITION KEY INTERLOCK

(75) Inventors: Piet Visser, Walker; Stephen D. Wexall, Grand Haven, both of MI (US)

(73) Assignee: Grand Haven Stamped Products, Grand Haven, MI (US)

( * ) Notice: Under 35 U.S.C. 154(b), the term of this patent shall be extended for 0 days.

(21) Appl. No.: 09/298,021

(22) Filed: Apr. 22, 1999

(51) Int. Cl.[7] .............................. F16H 59/74; F16H 63/36
(52) U.S. Cl. .............................. 477/99; 70/247; 70/248; 74/473.22; 477/96
(58) Field of Search ................. 70/247, 248; 74/473.22; 192/220.3, 220.4, 220.5; 477/96, 99

(56) References Cited

U.S. PATENT DOCUMENTS

| | | |
|---|---|---|
| 1,352,489 | 9/1920 | Whitt . |
| 1,525,993 | 2/1925 | Hurd . |
| 1,791,807 | 2/1931 | Doane . |
| 2,890,581 | 6/1959 | Lewis . |
| 3,590,613 | 7/1971 | Kimberlin et al. . |
| 4,884,423 | 12/1989 | Fancher . |
| 4,926,688 | 5/1990 | Murasaki . |
| 4,932,283 | 6/1990 | Ishigami et al. . |
| 4,932,493 | 6/1990 | Sakurai et al. . |
| 4,959,982 | 10/1990 | Mauz et al. . |
| 4,967,883 | 11/1990 | Kito et al. . |
| 5,085,096 | 2/1992 | Behrens . |
| 5,096,033 | 3/1992 | Osborn . |
| 5,566,581 * | 10/1996 | Smale et al. ................... 477/99 X |
| 5,588,934 | 12/1996 | Osborn et al. . |
| 5,649,452 | 7/1997 | Osborn et al. . |
| 5,651,290 | 7/1997 | Osborn et al. . |
| 5,662,001 * | 9/1997 | Smale ................... 477/99 X |
| 5,857,938 * | 1/1999 | Porter ................... 477/99 |

* cited by examiner

Primary Examiner—Allan D. Herrmann
(74) Attorney, Agent, or Firm—Price Heneveld Cooper Dewitt & Litton

(57) ABSTRACT

A shifter construction for shifting a transmission includes a base, a shift lever pivotally supported on the base at a main pivot for movement between a plurality of gear positions including a particular gear position, and an ignition switch constructed to move between a key-released position and a key-retaining position. An interlock cam is pivotally supported on the base at an interlock pivot and operably connected to the shift lever and to the ignition switch. The interlock cam is movable between a locked position where the interlock cam prevents the shift lever from moving from the particular gear position but allows the ignition switch to be moved, and an unlocked position where the shift lever is allowed to move but the ignition switch is held in the key-retaining position. The interlock cam has an interlock stop spaced from the interlock pivot. The shift lever includes an interlock protrusion that fits into a notch in the interlock cam between the interlock pivot and the interlock stop when the shift lever is in the particular gear position and the interlock cam is in the locked position. The shift lever, when initially being moved out of the particular gear position, moves the interlock protrusion along a line generally connecting the interlock pivot and the interlock stop when the interlock cam is in the locked position. The interlock cam is configured to withstand significant force without deformation. An attempt to forcibly move the shift lever out of the particular gear position when the interlock cam is in the locked position causes the interlock cam to move into engagement with the interlock stop without causing a rotational force on the interlock cam that would move the interlock cam toward the unlocked position.

24 Claims, 7 Drawing Sheets

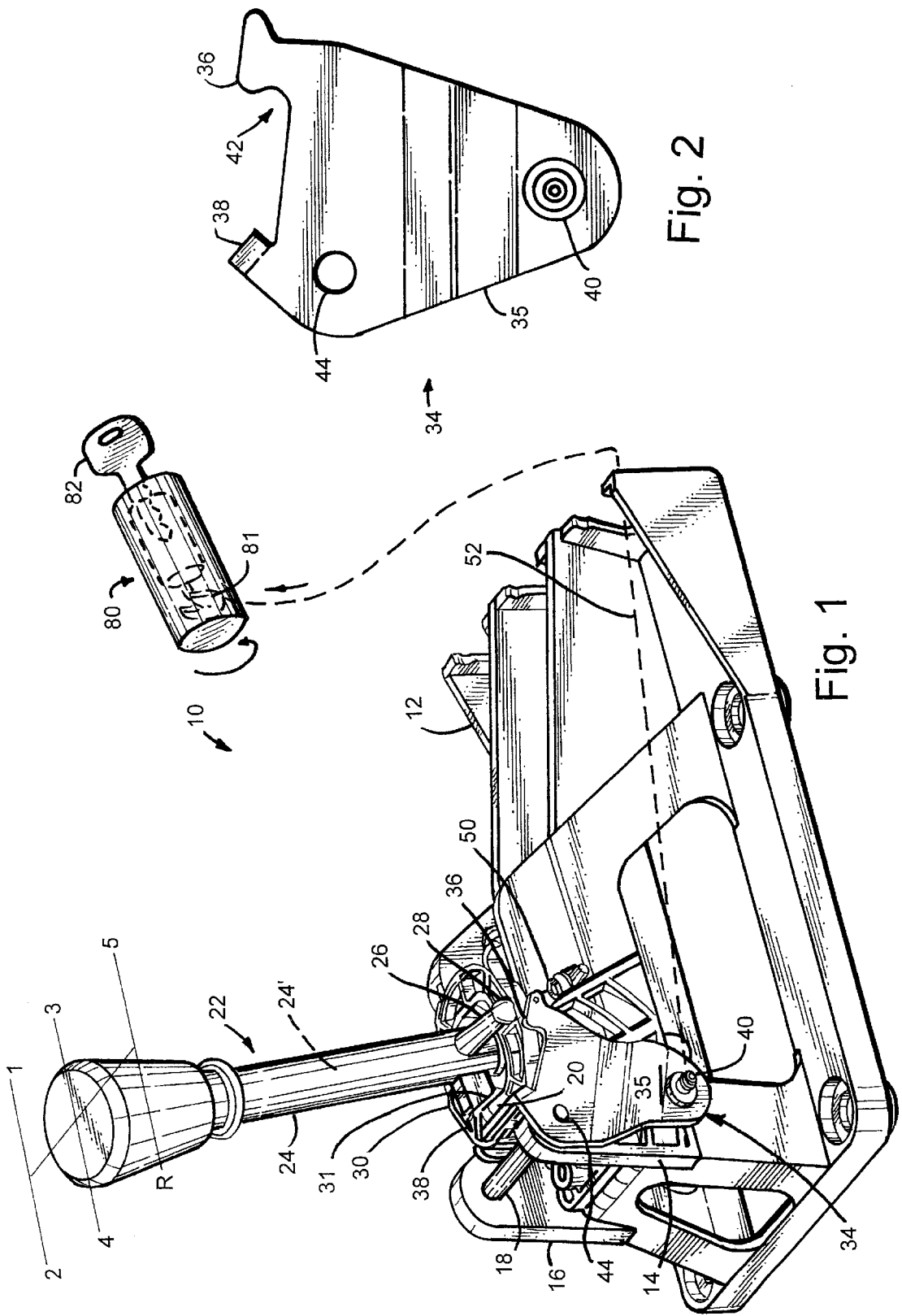

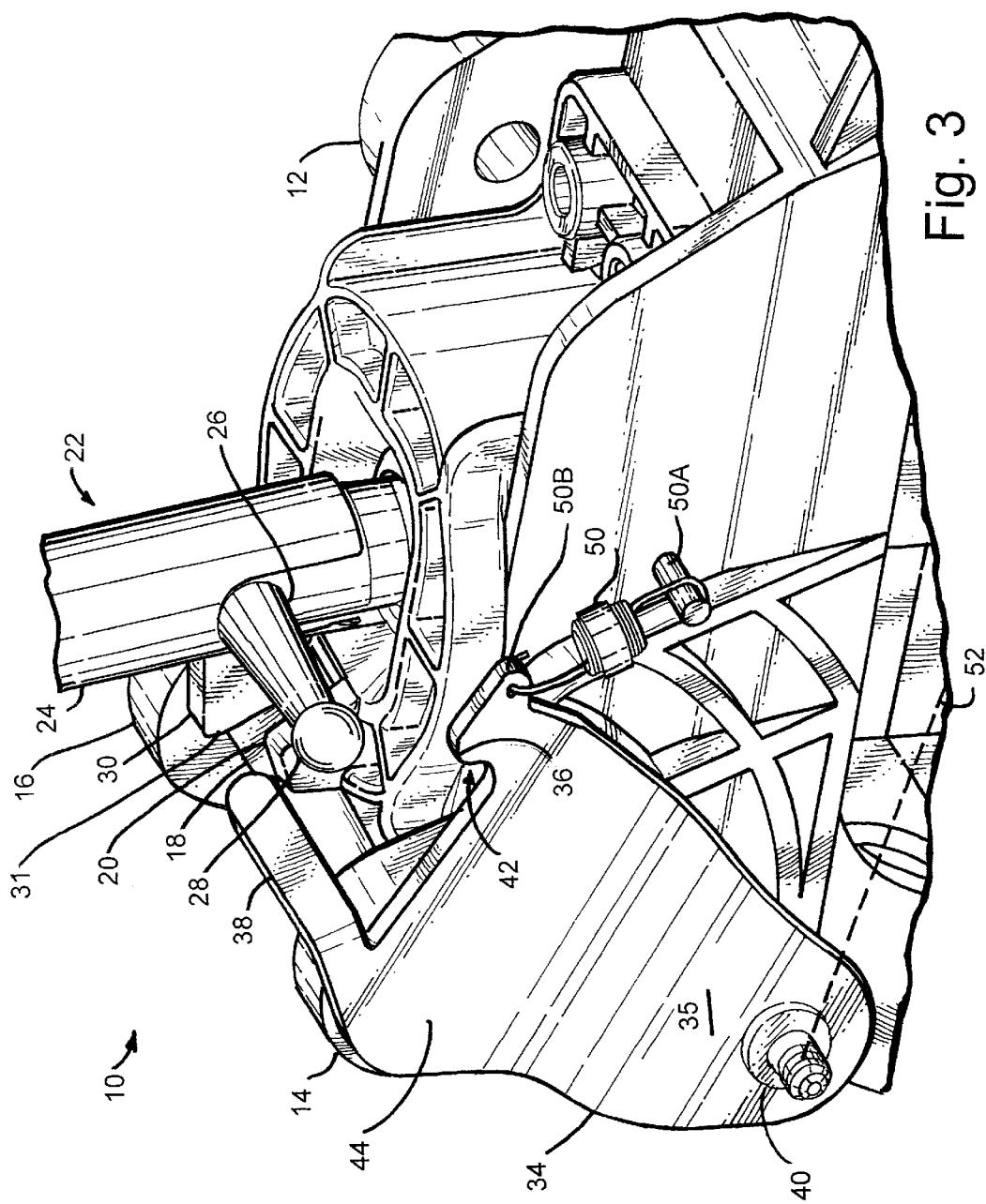

SHIFTER WITH REVERSE AND IGNITION KEY INTERLOCK

BACKGROUND OF THE INVENTION

The present invention concerns vehicle shifters for shifting manual transmissions, and more particularly concerns a shifter having a shift lever and an interlock device for insuring that the vehicle shift lever is always in a reverse gear position when the ignition switch is in a key-removable off position, and for ensuring that the ignition switch is in a key-retaining on position before the shift lever can be moved out of the reverse gear position.

Vehicle manufacturers have various mechanisms to ensure that a vehicle's transmission is in a desired position prior to starting the vehicle. It is also desirable to include mechanisms that ensure that the transmission is in a desired gear while the vehicle is turned off, similar to the requirement for an automatic transmission to be in "PARK" when the vehicle is turned off. To date, no known manufacturer has offered an interlock capable of doing both. Further, no known manufacturer has designed an interlock system of sufficient strength to prevent a forced override for manual transmissions.

Therefore, an interlock mechanism is desired solving the aforementioned problems and that is compact, simple, easy to assemble, and strong enough to prevent forcibly overriding the interlock system.

SUMMARY OF THE INVENTION

In one aspect of the present invention, a shifter construction for shifting a transmission includes a base, a shift lever pivotally supported on the base at a main pivot for movement between a plurality of gear positions including a particular gear position, and an ignition switch constructed to move between a key-released position and a key-retaining position. An interlock cam is pivotally supported on the base at an interlock pivot and operably connected to the shift lever and to the ignition switch. The interlock cam is movable between a locked position where the interlock cam prevents the shift lever from moving from the particular gear position but allows the ignition switch to be moved, and an unlocked position where the shift lever is allowed to move but the ignition switch is held in the key-retaining position. The interlock cam has an interlock stop spaced from the interlock pivot. The shift lever includes an interlock protrusion that fits into a notch in the interlock cam between the interlock pivot and the interlock stop when the shift lever is in the particular gear position and the interlock cam is in the locked position. The shift lever, when initially being moved out of the particular gear position, moves the interlock protrusion along a line generally connecting the interlock pivot and the interlock stop when the interlock cam is in the locked position. The interlock cam is configured to withstand significant force without deformation. An attempt to forcibly move the shift lever out of the particular gear position when the interlock cam is in the locked position causes the interlock cam to move into engagement with the interlock stop, without causing a rotational force on the interlock cam that would move the interlock cam toward the unlocked position.

In another aspect, a shifter construction for shifting a manual transmission includes a base adapted for attachment to a vehicle. A shift lever is pivotally supported on the base for movement between a plurality of gear positions arranged in a two-dimensional pattern including a reverse gear position, the shift lever being configured for operative attachment to a manual transmission. An ignition switch is mounted on the base and constructed to move between a key-released position and a key-retaining position. An interlock device is movably supported on the base and operably connected to the shift lever and to the ignition switch for movement between first and second positions. The interlock device, when in the first position, locks the shift lever in the reverse gear position and permits the ignition switch to be moved between the key-released position and the key-retaining position. The interlock device, when in the second position, permits the shift lever to be moved between the plurality of gear positions but holding the ignition switch in the key-retaining position.

In another aspect, a method of vehicle control includes steps of providing a base and a shift lever pivoted to the base. The shift lever is movable between a plurality of gear positions including a reverse gear position, with the plurality of gear positions being arranged in a two-dimensional pattern. The shift lever is configured for operative attachment to a manual transmission. The method further includes providing an ignition switch mounted on the base, the ignition switch being movable between a key-released position and a key-retaining position, and providing an interlock device constructed to operatively interconnect the ignition switch and the shift lever. The method includes interconnecting the shift lever and the ignition switch with the interlock device to retain the shift lever in the reverse gear position when the ignition switch is in the key-released position, and to prevent movement of the ignition switch out of the key-retaining position when the shift lever is not in the reverse gear position.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a side elevational perspective view of the vehicle transmission shifter embodying the present invention;

FIG. 2 is a side elevational view of the interlocking cam;

FIG. 3 is an enlarged side elevational view of the shifter with the interlocking cam in a disengaged non-interlocked position;

DETAILED DESCRIPTION OF PREFERRED EMBODIMENT

Figure 4:
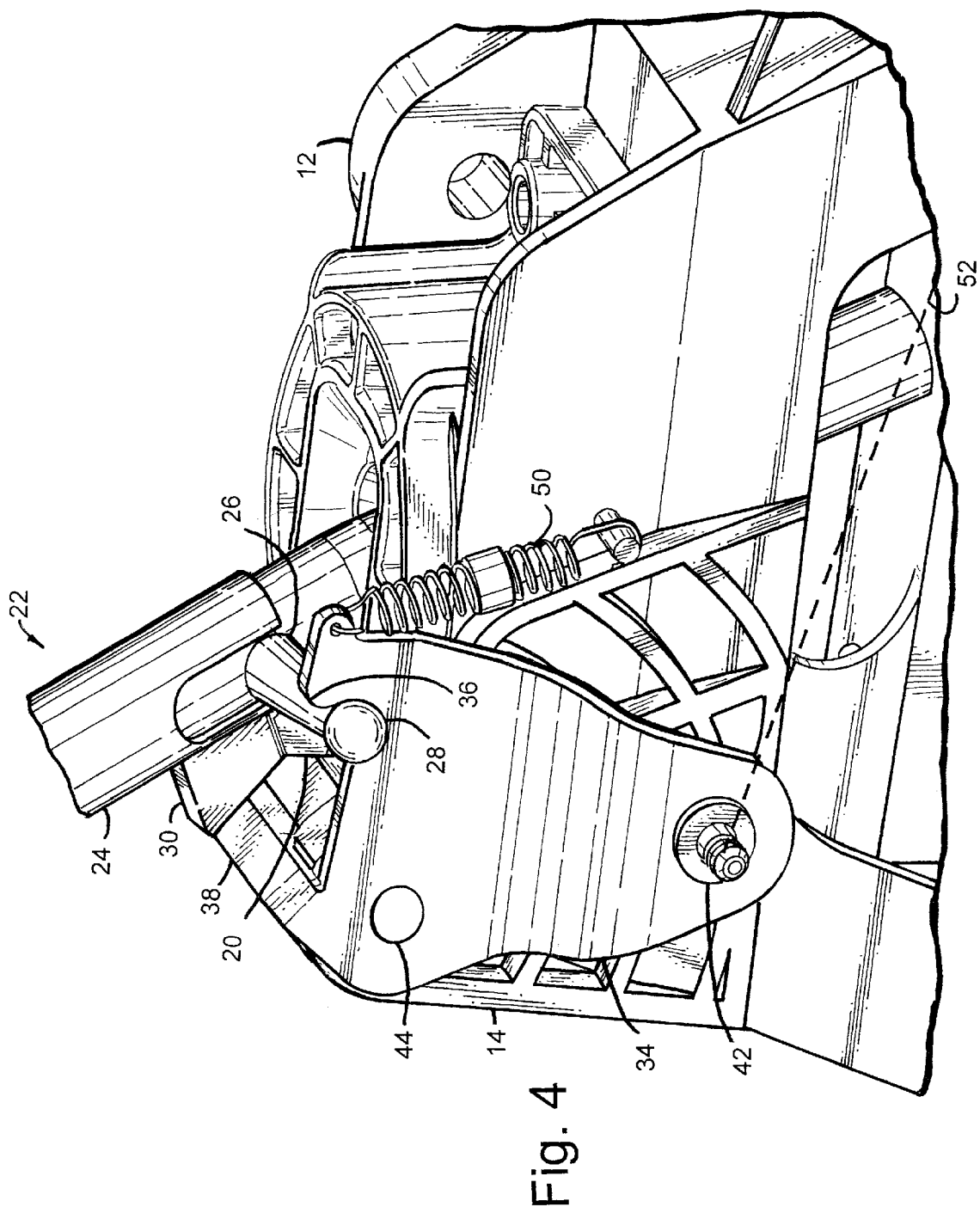
FIG. 4 is an enlarged side elevational view of the shifter with the interlocking cam in an engaged interlocking position.
Figure 5:
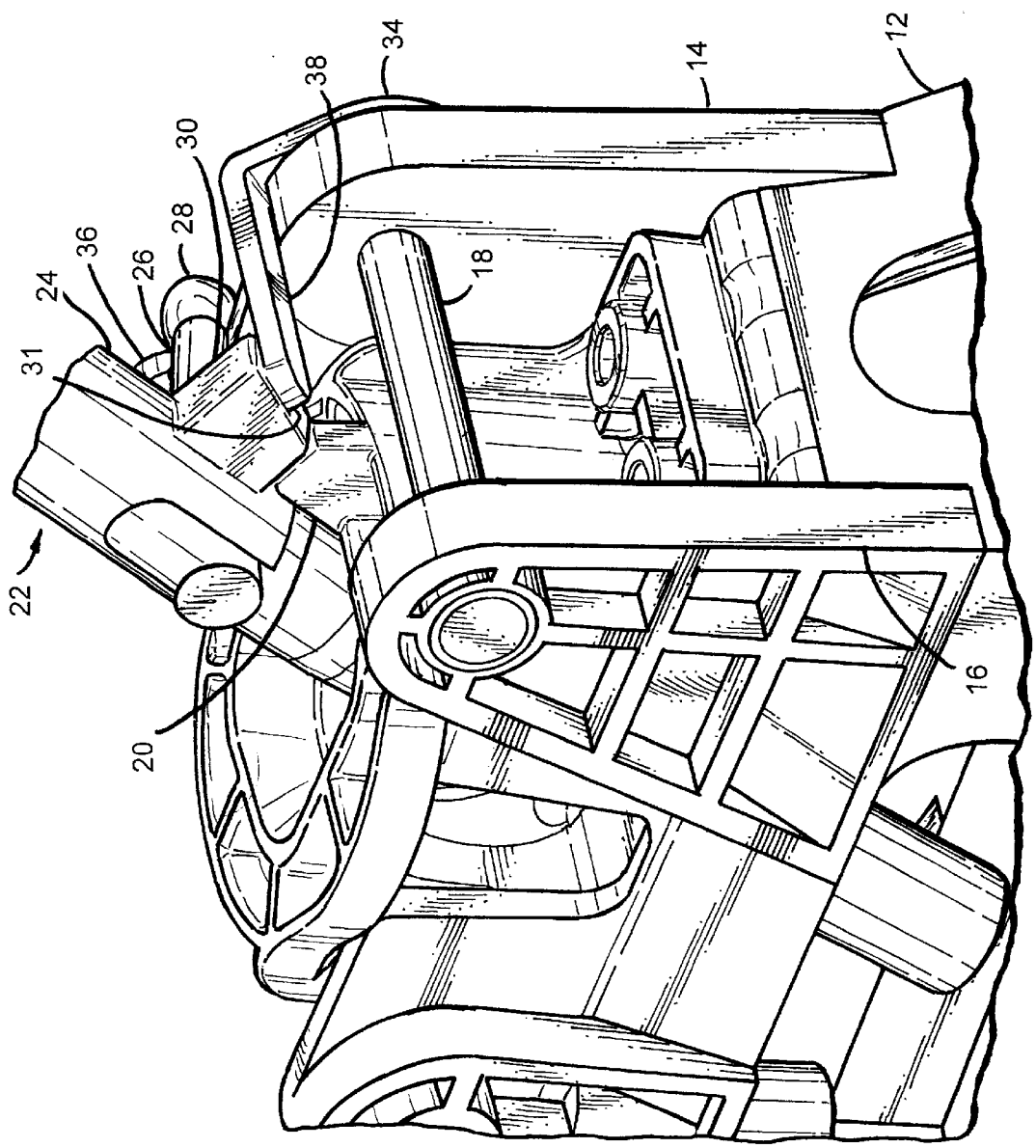
FIG. 5 is an enlarged side elevational view of the opposite side of FIG. 4.
Figure 6:
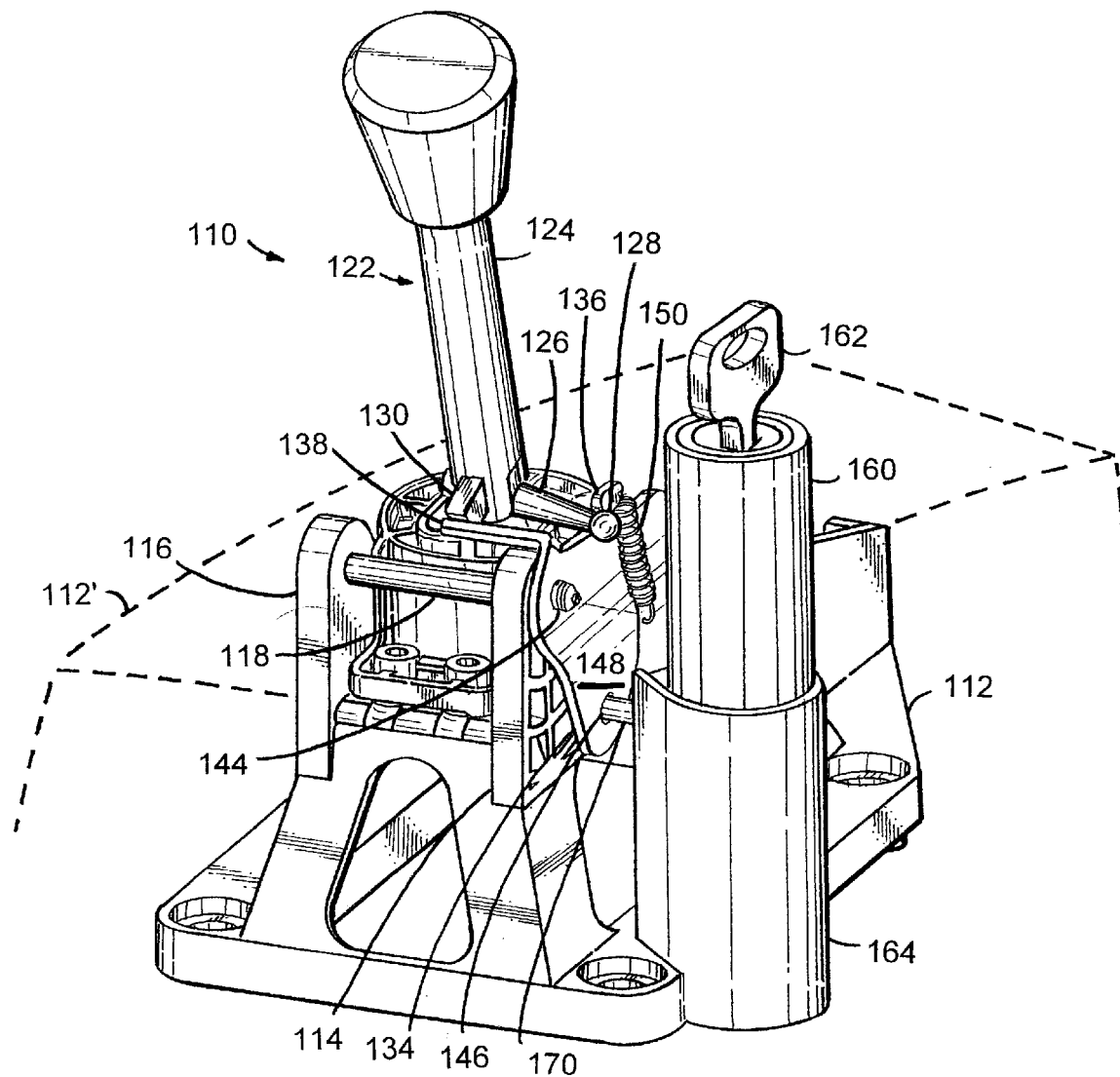
FIG. 6 is a rear elevational perspective view of an alternate embodiment of the vehicle transmission shifter having the ignition switch mounted to the shifter base.
Figure 7:
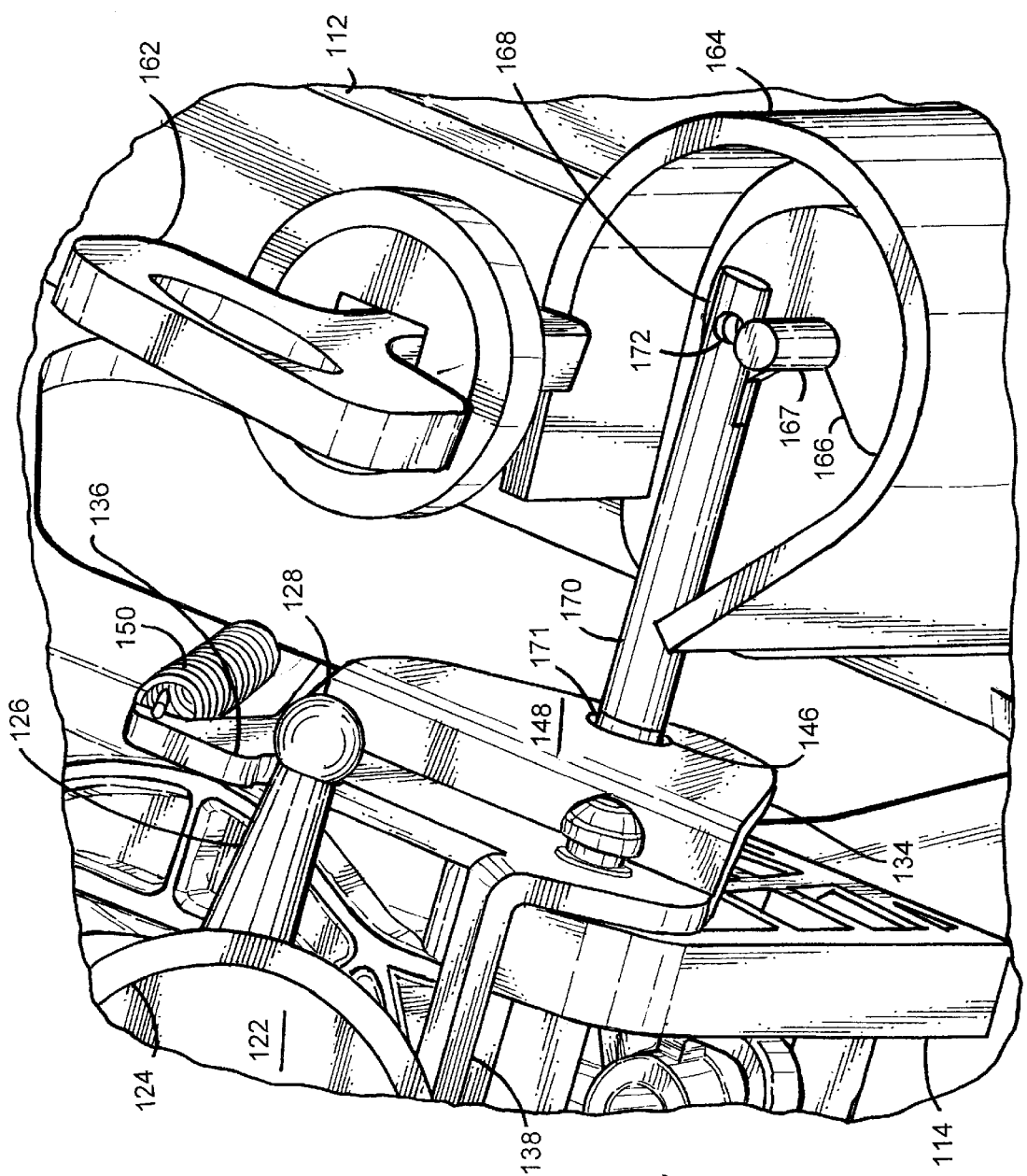
FIG. 7 is an enlarged top partially fragmented perspective view of the locking pin extending from the ignition switch and engaging the interlocking device.
Figure 8:
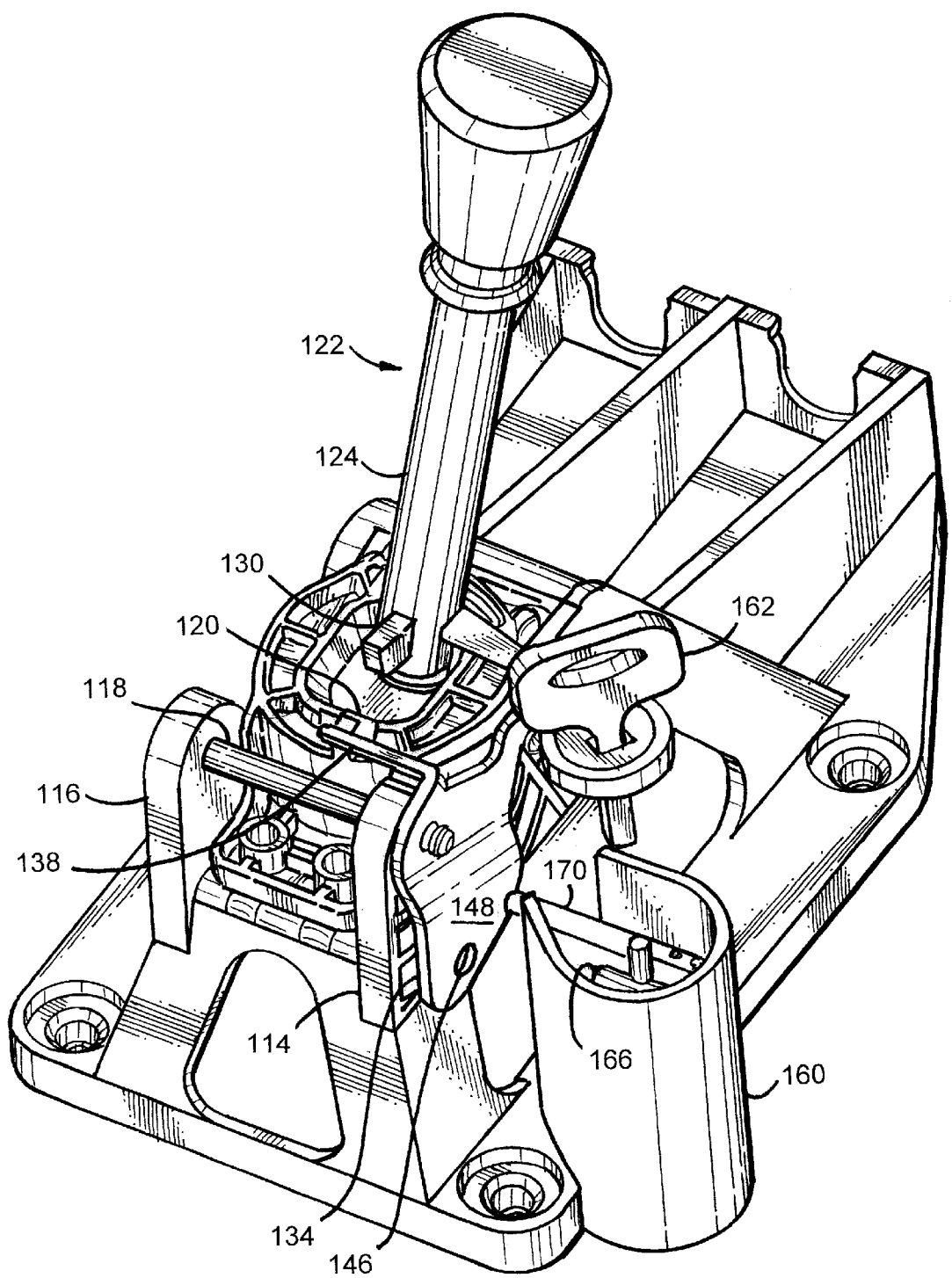
FIG. 8 is a rear elevational perspective view of the locking pin disengaged from the interlocking device.

Two manual shifting mechanisms for an automobile vehicle are shown that incorporate a reverse gear and an ignition key interlock. The interlocks are designed to prevent the rotation of the ignition switch to the "OFF" position and to prevent withdrawal of the ignition key unless the transmission is shifted into reverse gear. The interlocks further lock the transmission in reverse gear when the ignition key is in the "OFF" position and is withdrawn from the ignition switch. The transmission cannot be shifted out of reverse gear until the key is inserted in the ignition switch and rotated out of the "OFF" position. Two versions of the interlock arrangement are shown, the first including a cable (FIGS. 1–5), the second being cableless (FIGS. 6–8).

Shifter 10 (FIG. 1) includes a base 12 adapted for attachment to a vehicle, and a shift lever 22 constructed for operative connection to a vehicle's manual transmission (not shown) for shifting between gears of the transmission. Manual transmissions, shifters therefor, and cable or rod linkage connections for operably interconnecting same are widely known and need not be described herein for an understanding of the present invention. Base 12 includes first and second sides 14 and 16 at a rear portion of the shifter. A pivot pin 18 extends between first and second sides 14 and 16. A stop 20 extends upward from base 12, the function of which will be discussed in greater detail below.

A shifting lever assembly 22 (also called a "shift lever" herein) is pivotally supported on base 12 at a main pivot for movement between a plurality of gear positions including forward and reverse gears. The pivotal support of the shift lever (not shown) is of a common and conventional design and well known in the industry. Shift lever 22 includes a lift ring 24, which is sleeved over and translates longitudinally with respect to a center post 24' of shift lever 22. Lift ring 24 has a normal position enabling the shifting of the transmission between a plurality of forward gears. However, lift ring 24 includes a rearwardly oriented protrusion 30 at a lower portion thereof. When lift ring 24 is in its normal position, protrusion 30 interferes with stop 20 on base 12. The interference prevents the shift lever 22 and the transmission from being shifted into reverse gear, unless lift ring 24 is translated longitudinally upward so that protrusion 30 is elevated above stop 20, thereby permitting the transmission to be shifted into reverse gear. The central post 24' of shift lever 22 also has an interlock protrusion 26 extending laterally outwardly from a bottom section of the post 24' of the shift lever 22. In the preferred embodiment, interlock protrusion 26 is slightly tapered and includes a ball-shaped end 28 for engaging the interlock mechanism, as described below.

An interlock cam 34 is pivotally mounted to first side 14 of shifter base 12. Interlock cam 34 is attached to one end of pivot pin 18 at pivot 44. Interlock cam 34 pivots about a longitudinal axis of pivot pin 18 between an engaged shift-lever-interlocking position (FIG. 4) and a disengaged non-shift-lever-interlocking position (FIG. 1). Interlock cam 34 has a lower portion 35 which includes connector 40 attached to tension cable 52. The upper portion of interlock cam 34 is C-shaped. The C-shape cam 34 has a first leg about which interlock cam 34 pivots and a second leg that acts as an interlock stop 36 for abutting contact with interlock protrusion 26 on shift lever 22. The legs of the C-shape cam 34 define a notch 42 which, when interlock cam 34 is rotated into an engaged position, captures the interlock protrusion 26 of shift lever 22. When cam 34 has captured interlock protrusion 26, protrusion 26 bears against stop 36 in such a manner that if someone attempted to force the shift lever assembly out of engagement, the force vector is directly aligned to the pivot axis of pin 18. This arrangement yields a particularly strong interlock, which will withstand 200 pounds of force applied to shift lever 22 without inducing or transferring an adverse pivotal force in cam 34. Further, the force is tensile and not compressive, such that the arrangement provides a much stronger, better engineered arrangement. Interlock cam 34 also includes a flange 38 extending laterally to base 12 at substantially a right angle to interlock cam 34. Flange 38 is positioned such that when lift ring 24 is lifted to raise rear protrusion 30 above stop 20 to permit the transmission to be shifted into reverse gear, rear protrusion 30 of lift ring 24 will contact flange 38 when interlock cam 34 is in its disengaged position and as shift lever 22 is pulled rearward.

A tension biasing spring 50 (FIG. 3) has one end attached to shifter base 12 at location 50A and another end attached to interlock cam 34 at location 50B in such a manner as to bias interlock cam 34 in a disengaged and non-interfering position with respect to interlock protrusion 26 of shift lever 22.

Operation

Having described the reverse gear and ignition key interlock mechanism of this invention, its operation will be evident from the above description to a person skilled in this art. Nevertheless, the following is a description of the interlock mechanism operation.

During normal operation of the vehicle, the ignition switch is in the "ON" position wherein tension cable 52 is in a semi-relaxed state. Biasing spring 50 maintains interlock cam in its disengaged position as shown in FIG. 3 with minimal tension on cable 52. When an operator wants to shift into reverse gear, lift ring 24 is raised to permit rear protrusion 30 to be elevated above stop 20 of base 12. As shift lever 22 is positioned corresponding to reverse gear, rear protrusion 30 is allowed to ride on the top of stop 20. As the shift lever 22 is fully pivoted to the extent of its travel in reverse gear (FIG. 4), rear base 31 of protrusion 30 contacts flange 38 of interlock cam 34. The contact of face 31 upon flange 38 pivots interlocking cam 34 about pivot pin 18 and pivot 44. The force applied by protrusion 30 on flange 38 overcomes the biasing force of spring 50. Cam 34 is rotated to a position where interlock protrusion 26 can be captured in notch 42 of interlock cam 34. With the ignition switch in the "ON" position, tension cable 32 is in a relaxed state and if shift lever 22 is shifted out of reverse gear, biasing spring 50 will again rotate interlock cam 34 to a disengaged position as protrusion 30 moves forwardly and reduces pressure upon flange 38. Thus, when the ignition switch is in the "ON" position, the shift lever 22 can be shifted freely between all gears, forward and reverse.

When an operator wants to turn off the engine and remove the ignition key, the shift lever 22 must be placed in the reverse gear position by raising the lift ring 24, thereby elevating protrusion 30 above stop 20. Protrusion 30 contacts flange 38 of interlock cam 34, thereby pivoting interlock cam 34 about pivot axis 44 to capture interlock protrusion 26 in notch 42, as previously described. When the ignition switch 80 is turned to the key-removable position, tension is applied to tension cable 52 to completely pivot cam 34 and fully capture interlock protrusion 26 in notch 42. The interlock protrusion 26 is more positively retained as a result of spherical end 28 being slightly larger than the diameter of protrusion 26, such that when protrusion 26 is fully captured by notch 42, spherical end 28 bears slightly on an outer edge of notch 42. When fully captured, interlock protrusion 26 bears on stop 36 of interlock cam 34 in such a manner that a force applied to shift lever 22 in an attempt to forcibly override interlock cam 34 is applied to stop 36 with the force vector thereof intersecting pivot axis 44. The force vector intersecting pivot axis 44 permits interlock cam 34 to provide maximum retention strength of shift lever 22 in the reverse gear position. The intersection of the force vector with the pivot axis 44 does not induce any adverse pivoting or rotational moment acting adversely to the interlocking function of interlock cam 34. In the illustrated preferred embodiment, the interlock cam 34 can withstand a 200-pound force applied to shift lever 22 without deformation, thereby providing a positive retention of interlock protrusion 26 by interlock cam 34.

When the ignition key is again turned to the key-retaining position, the tension force on tension cable 52 is relaxed permitting bias spring 50 to partially disengage stop 36 from interlock protrusion 26, and further permitting shift lever 22 to be taken out of reverse gear. In the key-retaining on position, the interlock 81 (FIG. 1) positively moves to a key-engaging position that prevents the key 82 from being removed as is well known in the art of vehicle ignition keys.

Alternate Embodiment

An alternate embodiment is shown in FIGS. 6–8 wherein the ignition switch and corresponding key are integrally mounted to the base and the tension cable is eliminated. Where reference numbers of the embodiment shown in FIGS. 6–8 indicate like elements as in the embodiment of FIGS. 1–5, the reference numbers are identical reference numbers preceded by the numeral 1.

In the alternate embodiment of the shifter 110, ignition switch 160 (FIG. 6) is mounted to base 112 in a console 112. Ignition switch 160 is activated by a removable key 162, which is rotatable within ignition switch 160. The rotational movement of key 162 is coupled through ignition switch 160 to locking actuator 164.

Referring now to FIG. 7, key 162 is substantially in longitudinal alignment with actuator shaft 167. As key 162 is rotated, the rotational force is transferred through ignition switch 160 (removed for clarity) to rotate shaft 167. A partial disk 166 is attached to shaft 167 and as shaft 167 is rotated, partial disk 166 rotates within its plane. Locking pin 170 has one end pivotally attached to end 168 of partial disk 166 at 172, and locking pin 170 extends to interlock cam 134. Interlock cam 134 has an aperture 146 in a lower portion of cam 134, such that when ignition switch 160 and key 162 are rotated to the key-removable position, locking pin 170 is extended toward cam 134 until an outer end 171 is engaged within aperture 146. When end 171 is engaged in aperture 146, shift lever 122 is in the reverse gear position and must remain in that position until key 162 is again inserted in ignition switch 160 and rotated to the key-retaining position. When switch 160 is so rotated, shaft 167 is correspondingly rotated, thereby disengaging end 171 from aperture 146 permitting the disengagement of stop 136 from interlock protrusion 126 and permitting the shifting of shift lever assembly in all shift positions. When disengaged from aperture 146, end 171 of locking pin 170 bears on the outer surface 148 of cam 134 preventing the rotation of the ignition switch to the key-release position.

From the foregoing description, it should be readily evident by those skilled in the art that the present invention provides a novel interlock mechanism between a vehicle's ignition switch and its transmission shifter, wherein the key cannot be removed from the ignition switch unless the shifter is in a predetermined shift position, preferably the reverse gear position, and further where the transmission cannot be shifted out of the designated gear position until the ignition key is inserted into the ignition switch and rotated to a key-retaining position. The unique configuration and position of the interlock cam also provides significant retention force of the shift lever assembly, such that any force applied to the shift lever assembly acts directly through a pivoting axis of the cam and does not impart any pivoting or rotational movement to the cam which would counteract the engagement of the cam with the shift lever. Notably, the structure of the embodiment of FIGS. 1–5 and FIGS. 6–8 are designed to withstand forces of over 200 pounds on the shift lever without failure.

Those skilled in the art will, of course, appreciate the many advantages of the present invention over that shown in the prior art and will also recognize that many modifications can be made without departing from the concept and spirit of the invention. It is, therefore, intended that equivalent arrangements are to be included as part of this invention.

The invention claimed is:

1. A shifter construction for shifting a transmission comprising:

a base;

a shift lever pivotally supported on the base at a main pivot for movement between a plurality of gear positions including a particular gear position;

an ignition switch constructed to move between a key-released position and a key-retaining position;

an interlock cam pivotally supported on the base at an interlock pivot and operably connected to the shift lever and to the ignition switch for movement between a locked position where the interlock cam prevents the shift lever from moving from the particular gear position but allows the ignition switch to be moved, and an unlocked position where the shift lever is allowed to move but the ignition switch is held in the key-retaining position, the interlock cam having an interlock stop spaced from the interlock pivot, the shift lever including an interlock protrusion that fits into a notch in the interlock cam between the interlock pivot and the interlock stop when the shift lever is in the particular gear position and the interlock cam is in the locked position; and the shift lever, when initially being moved out of the particular gear position, moving the interlock protrusion along a line generally connecting the interlock pivot and the interlock stop when the interlock cam is in the locked position, the interlock cam being configured to withstand significant force without deformation, whereby attempting to forcibly move the shift lever out of the particular gear position when the interlock cam is in the locked position causes the interlock protrusion to move into engagement with the interlock stop without causing a rotational force on the interlock cam that would move the interlock cam toward the unlocked position.

2. A shifter construction as defined in claim 1, wherein the particular gear position is a reverse gear position.

3. A shifter construction as defined in claim 2, wherein the interlock cam is C-shaped, one leg of said C-shape comprising the interlock pivot and an opposing leg of the C-shape comprising the interlock stop, and fixer wherein the legs define a notch therebetween.

4. A shifter construction as defined in claim 3, wherein the interlock cam is pivoted to the base at a lockout pivot defining a lockout pivot axis.

5. A shifter construction as defined in claim 4, wherein the shifting force to move the shift lever out of the particular gear position when the interlock cam is in the locked position passes through the lockout pivot axis.

6. A shifter construction as defined in claim 5, wherein the interlock cam can withstand a 200-pound shifting force.

7. A shifter construction as defined in claim 1, further including a tension cable wherein one end of the tension cable is attached to an ignition switch and a second end is attached to a connector on the interlock cam and adapted to move the interlock cam from the unlocked position to the locked position.

8. A shifter construction as defined in claim 7, wherein movement of the tension cable pivots the interlock cam.

9. A shifter construction as defined in claim 8, further including a spring biasing the interlock cam to an unlocked position when the ignition switch is in a key-removable position.

10. A shifter construction as defined in claim 1, wherein the shift lever includes a lift ring, the lift ring translatable along a longitudinal axis of the shift lever between a normal position and a reverse gear position requiring lifting of the lift ring, the normal position of the lift ring preventing accidental shifting into reverse gear.

11. A shifter construction as defined in claim 10, wherein the interlock cam includes a flange and the lift ring includes a rear protrusion, wherein lifting of the lift ring when shifting into reverse causes the rear protrusion to abut the flange and pivot the interlock cam into the locked position.

12. A shifter construction as defined in claim 11, wherein the pivot pin is mounted to a first sidewall of the base.

13. A shifter construction as defined in claim 12, wherein the pivot pin is mounted both to the first sidewall of the base and to a second sidewall of the base.

14. A shifter construction as defined in claim 1, wherein the ignition switch is mounted to the base.

15. A shifter construction for shifting a manual transmission comprising:

a base adapted for attachment to a vehicle;

a shift lever pivotally supported on the base for movement between a plurality of gear positions arranged in a two-dimensional pattern including a reverse gear position, the shift lever being configured for operative attachment to a manual transmission;

an ignition switch mounted on the base and constructed to move between a key-released position and a key-retaining position;

an interlock device movably supported on the base and operably connected to the shift lever and to the ignition switch for movement between first and second positions, the interlock device, when in the first position, locking the shift lever in the reverse gear position and permitting the ignition switch to be moved between the key-released position and the key-retaining position, the interlock device, when in the second position, permitting the shift lever to be moved between the plurality of gear positions but holding the ignition switch in the key-retaining position;

wherein the shift lever includes a lift ring, the lift ring translatable along a longitudinal axis of the shift lever between a normal position and a reverse gear position requiring lifting of the lift ring, the normal position of the lift ring preventing accidental shifting into reverse gear, and wherein the interlock device includes a flange and the lift ring includes a lockout protrusion, wherein lifting of the lift ring when shifting into reverse causes the lockout protrusion to abut the flange and move the interlock device into the locked position.

16. A shifter construction as defined in claim 15, further including a locking pin operably connecting the ignition switch and the interlock device.

17. A shifter construction as defined in claim 16, wherein the interlock device includes an aperture therethrough, such that the locking pin is engaged within the aperture when the ignition switch is in the key-released position to maintain the interlock device in the first position locking the shift lever in the reverse gear position, and that the locking pin is withdrawn from the aperture when the ignition switch is in the key-retaining position.

18. A shifter construction as defined in claim 17, wherein the interlock device defines a face upon which an end of the locking pin bears when the interlock device is in the second position such that the ignition switch cannot be moved to the key-release position.

19. A shifter construction as defined in claim 15, wherein the interlock device can withstand a 200-pound shifting force.

20. A shifter construction for shifting a manual transmission comprising:

a base adapted for attachment to a vehicle;

a shift lever pivotally supported on the base for movement between a plurality of gear positions arranged in a two-dimensional pattern including a reverse gear position, the shift lever being configured for operative attachment to a manual transmission;

an ignition switch mounted on the base and constructed to move between a key-released position and a key-retaining position; and an interlock device movably supported on the base and operably connected to the shift lever and to the ignition switch for movement between first and second positions, the interlock device, when in the first position, locking the shift lever in the reverse gear position and permitting the ignition switch to be moved between the key-released position and the key-retaining position, the interlock device, when in the second position, permitting the shift lever to be moved between the plurality of gear positions but holding the ignition switch in the key-retaining position;

wherein the interlock device can withstand a 200 pound shifting force; and a spring biasing the interlock device to an unlocked position when the ignition switch is in a key-removable position.

21. A shifter construction as defined in claim 20, wherein the shift lever includes a lift ring, the lift ring being translatable along a longitudinal axis of the shift lever between a normal position and a reverse gear position requiring lifting of the lift ring, the normal position of the lift ring preventing accidental shifting into reverse gear.

22. A shifter construction as defined in claim 21, wherein the interlock device includes a flange and the lift ring includes a rear protrusion, wherein lifting of the lift ring when shifting into reverse causes the rear protrusion to abut the flange and move the interlock device into the locked position.

23. A method of vehicle control comprising steps of:

providing a base and a shift lever pivoted to the base, the shift lever being movable between a plurality of gear positions including a reverse gear position, the plurality of gear positions being arranged in a two-dimensional pattern and the shift lever being configured for operative attachment to a manual transmission;

providing an ignition switch mounted on the base, the ignition switch being movable between a key-released position and a key-retaining position;

providing an interlock device constructed to operatively interconnect the ignition switch and the shift lever; and interconnecting the shift lever and the ignition switch with the interlock device to retain the shift lever in the reverse gear position when the ignition switch is in the key-released position and to prevent movement of the ignition switch out of the key-retaining position when the shift lever is not in the reverse gear position, where the shift lever includes a lift ring, the lift ring translatable along a longitudinal axis of the shift lever between a normal position and a reverse gear position requiring lifting of the lift ring, the normal position of the lift ring preventing accidental shifting into reverse gear, and wherein the interlock device includes a flange and the lift ring includes a lockout protrusion, wherein lifting of the lift ring when shifting into reverse causes the lockout protrusion to abut the flange and move the interlock device into the locked position.

24. A method of vehicle control comprising steps of:

providing a base and a shift lever pivoted to the base, the shift lever being movable between a plurality of gear positions including a reverse gear position, the plurality of gear positions being arranged in a two-dimensional pattern and the shift lever being configured for operative attachment to a manual transmission;

providing an ignition switch mounted on the base, the ignition switch being movable between a key-released position and a key-retaining position; providing an interlock device constructed to operatively interconnect the ignition switch and the shift lever; and interconnecting the shift lever and the ignition switch with the interlock device to retain the shift lever in the reverse gear position when the ignition switch is in the key-released position and to prevent movement of the ignition switch out of the key-retaining position up to at least a 200-pound shifting force when the shift lever is not in the reverse gear position;

wherein the interlock device can withstand a 200-pound shifting force, and further including a spring biasing the interlock device to an unlocked position when the ignition switch is in a key-removable position.

* * * * *